United States Patent [19]

Davis et al.

[11] Patent Number: 5,038,676
[45] Date of Patent: Aug. 13, 1991

[54] ELECTRIC DEEP FAT FRYING SYSTEM

[75] Inventors: John R. Davis, Shreveport; John A. Meister, Haughton; Randy C. Roberts, Shreveport, all of La.

[73] Assignee: Electric Power Research Institute, Inc., Palo Alto, Calif.

[21] Appl. No.: 483,054

[22] Filed: Feb. 21, 1990

[51] Int. Cl.$^5$ .................... A47J 37/12; H05B 1/02
[52] U.S. Cl. ........................ 99/330; 99/331; 99/403; 219/494; 219/497; 219/501
[58] Field of Search .......... 99/330, 331, 336, 403–410, 99/358, 468; 219/497, 494, 501, 509, 295, 331, 499

[56] References Cited

U.S. PATENT DOCUMENTS

| | | | |
|---|---|---|---|
| 3,175,076 | 3/1965 | Fox et al. | 219/494 |
| 3,337,792 | 8/1967 | Engelson | 323/22 |
| 3,375,347 | 3/1968 | Seney | 219/499 |
| 3,842,243 | 10/1974 | Gregory | 219/497 |
| 3,946,200 | 3/1976 | Juodikis | 219/499 |
| 4,093,847 | 6/1978 | Walker et al. | 219/501 |
| 4,282,423 | 8/1981 | Volz | 99/330 |
| 4,603,622 | 8/1986 | Beck | 99/403 |
| 4,777,350 | 10/1988 | Crockett et al. | 219/497 |
| 4,817,510 | 4/1989 | Kowalics et al. | 99/331 |
| 4,822,982 | 4/1989 | Lee, Jr. | 219/497 |
| 4,913,038 | 4/1990 | Burkett et al. | 99/331 |

Primary Examiner—Timothy F. Simone
Attorney, Agent, or Firm—Hubbard, Thurman, Tucker & Harris

[57] ABSTRACT

An Improved Deep Fat Frying System is disclosed which utilities heating elements controlled by triacs operated in the zero voltage switching mode by a programmed digital processor which can be used in a deep fat fryer and operated in a manner to minimize the maximum surface temperatures of the heating element surfaces during all phases of operation. The triacs together with the programmed digital processor allows the fryer to be controlled in all modes of operation to advantageously reduce peak power demand at various times during the daily operating cycle, to minimize maximum temperature required for efficient heat transference to the oil, and to reduce temperature overshoot. A method of operation has also been disclosed by which the maximum power consumption of a battery of two or more of the units can be minimized by maintaining a low power heat up during melt cycle or initial warm up all the way to a set point temperature.

3 Claims, 5 Drawing Sheets

ELECTRIC DEEP FAT FRYING SYSTEM

BACKGROUND OF THE INVENTION

This invention relates generally to commercial deep fat fryers, and more particularly relates to computer controlled, high powered, electrically heated deep fat frying systems utilizing solid state switching devices.

Current deep fat fryers used by commercial establishments for cooking large quantities of french fries and similar products are typically powered by three phase 240 volts. All such systems use mechanical or mercury type contactors to control the high current to the heating elements, often in a duty cycle modulated manner for temperature control. Each heating element usually includes a first set of contactors controlled by a high limit thermostat and associated circuitry which is connected in series with the primary contactors and the heating elements. The primary contactors are switched on and off by a thermostat control circuitry in order to achieve the precise temperature control required to produce consistent food products of acceptable quality. In this procedure, the primary contactors must be cycled on and off repeatedly. But, in order to keep the total switching cycles over the expected lifetime of the contractors to a reasonably low number, the contactors can only be switched at a relatively low rate. Duty cycles on the order of 30 seconds are typical. Such duty cycle periods are often greater than the thermal inertia of the heating elements resulting in temperature variations at the surface of the elements in contact with the cooking oil.

The use of triacs, a semiconductor switching device, as the main switching device for controlling power to a heating element has been suggested by prior art devices as disclosed in U.S. Pat. No. 3,946,200, to Juodikis, issued Mar. 23, 1976. This patent discloses the use of a triac controlled by a bridge circuit and zero voltage switches to provide switching of the triac at zero voltage cross over points to achieve proportional control of the power to the heating element and thus a constant temperature.

Commercial deep fat frying units of a type used in fast food establishments for cooking large loads of french fries and the like, typically employ a pair of separate cooking vats within each unit, and may have a number of different units. In these systems, the cooking oil degrades rapidly when subjected to excessive temperatures, and the cooking oil, together with power, are among the higher cost items of the business. In the normal operation of previous systems, the relatively long duration of the duty cycles result in the elements being left on for a number of seconds, followed by an off cycle during which the element cools down. As a result, the oil is exposed to peak temperatures greater than would be necessary if a more uniform temperature of the heating elements could be maintained.

These types of cooking systems have in recent times employed computers to control the on/off cycle of the cooking elements in a manner to minimize the maximum temperature of the heating elements during the melt cycle when solid shortening is first being melted and may not be in contact with portions of the heating elements. Even if liquid shortening is used, during the morning heat up cycle, the oil must be preheated to the set point or other standby temperature. The oil is typically heated rapidly with full power since there are typically a number of separate frypots, the power consumptioon of the facility exceeds the peak power defined by the local utility which often results in increased rates per unit of power.

SUMMARY OF THE INVENTION

The present invention if concerned with an improved deep fat frying system which utilizes heating elements, each controlled by triacs operated in the zero voltage switching mode by a programmed digital processor. The triacs are switches "on" and "off" at duty cycle rates substantially faster than thermal cycle rate of the heating elements so that a uniform desired temperature is obtained. Duty cycle rates of less than a second are typical, with switching lower to power cycle rates available. The resulting proportional control, together with the programmed digital processor, allows the fryer to be controlled in all modes of operation to advantageously reduce peak power demand at various times during the daily operating cycle, minimize maximum temperture at any time required for efficient heat transfer to the oil for the given operating requirement, improved control of the temperature of the cooking oil during the cooking cycle, and especially reduce temperature overshoot.

BRIEF DESCRIPTION OF THE DRAWINGS

These and other objects are accomplished in accordance with a preferred embodiment of the present invention as illustrated in the following drawings and detailed description wherein.

DESCRIPTION OF THE PREFERRED EMBODIMENT

Figure 1:
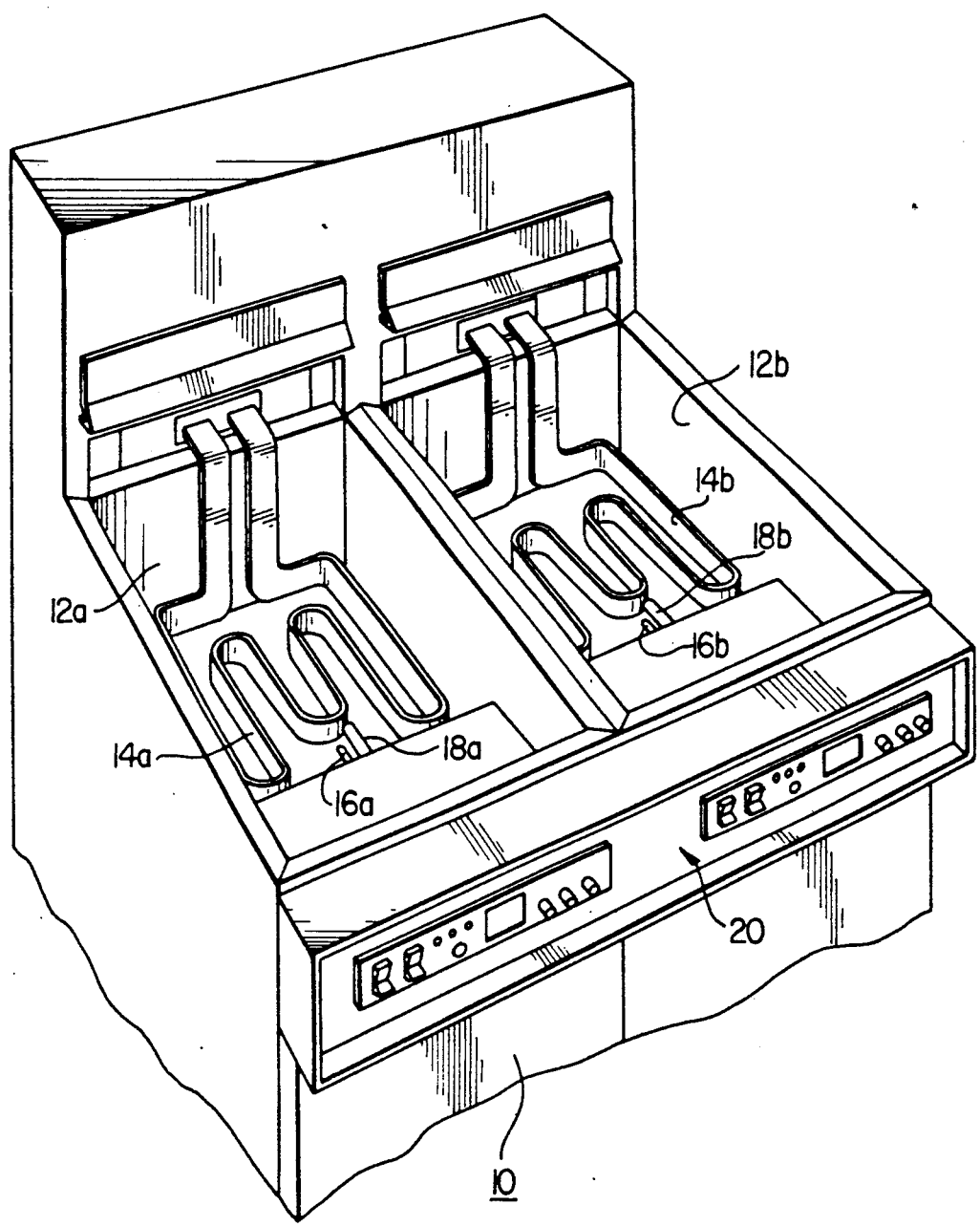
FIG. 1 is a perspective view of a multivat frying apparatus in accordance with the present invention.

Referring now to the drawings, and in particular to FIG. 1, a system in accordance with the present invention is indicated generally by the reference numeral 10. The system 10 includes a pair of cooking vats 12a and 12b disposed in side-by-side relationship with a single floor supported frame. The vats 12a and 12b include a three phase resistance type electrical heating element 14a and 14b, respectively, which are immersed within the cooking medium which may be any suitable shortening or oil. A pair of temperature sensing devices 16a and 18a and 16b and 18b for sensing the actual temperature of the cooking oil in each vat. The devices 16a and 16b are typically merely resistive temperature devices (RTD) used to sense temperatures and feed such information to the digital controller which will presently be described, while the thermostats 18a and 18b are mechanical high limit devices which are normally closed and open when a selected high limit temperature is reached. A single digital computer with appropriate single or multiple read outs as represented by the control panel 20 is used in combination with other circuit means to control the heating elements of the two cooking vats 12a and 12b, as will hereafter be described in greater detail.

Figure 2:
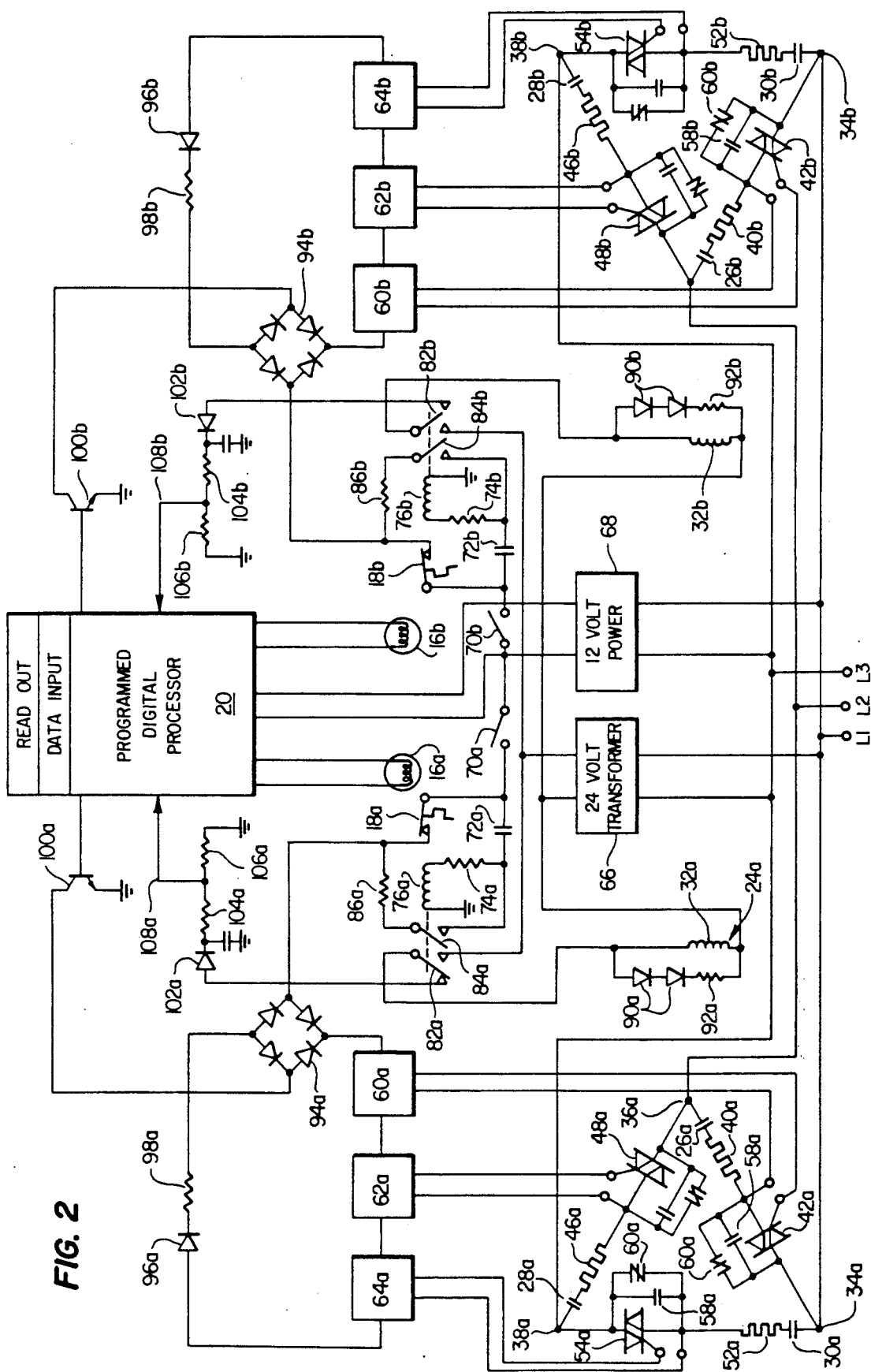
FIG. 2 is a schematic circuit diagram of the electrical system of the frying apparatus of FIG. 1.

Referring now to FIG. 2, the power supply comes in on lines L1, L2 and L3 and is typically 240 volts, three phase alternating current. FIG. 2 depicts identical circuits for the left and right frypots 12a and 12b Accordingly, the reference numerals used to identify the identical components for the left and right frypots will be designated by the same reference numerals followed by the reference characters "a" for the left-hand vat and "b" for the right-hand vat. For convenience, only the reference numerals and characters for the left-hand vat will now be described, it being understood that the control circuit for the right-hand vat is identical to and functions in an identical manner to that of the left-hand vat, both under the control of the digital computer 20. The power is thus applied through the three contactor switches of a mechanical relay indicated generally by the reference numeral 24a and includes three switches 26a, 28a, and 30a, driven by a coil 32a. The power from lines L1, L2 and L3 are thus applied to the nodes 34a, 36a, and 38a, respectively, of a delta configured power system. A first heating element 40a is connected in series with a triac 42a and a contactor 26a, between nodes 34a and 36a. Similarly, a heating element 46a is connected in series with a triac 48a and contactor 28a between nodes 36a and 38a, and the third heating element 52a is connected in series with a triac 54a and contactor 30a between nodes 38a and 34a. Each of the three power triacs is protected by a capacitor 58a and veristor 60a connected in parallel with the respective triacs. The triacs 42a, 48a and 54a are switched "on" by commercially available devices 60a, 62a and 64a. These devices may be Motorola Opto., Isolators part No. MOC3041. These devices effect zero voltage switching of the respective triacs on the next occurrence of zero voltage after a current is applied to the input of the devices. The contactor 24a is controlled by the high limit mechanical thermostat 18a which is normally closed until the high limit temperature is reached. The coil 32a which operates the contactor 24a is powered by a 24 volt power transformer 66a which is switched by a control circuit which includes a 12 volt power supply 68, a manually actuated on/off switch represented at 70a. An initial latching circuit is provided by a capacitor 72a, a resistor 74a, and resistor 86a and contact 84a of a relay indicated generally by the reference numeral 80a, the contacts 82a and 84a of which are normally in the position illustrated. Thus when the system is first turned on by closing the manual switch 70a, power is supplied through thermostat 18a and capacitor 72a and resistor 74a to close relay 80a. The current is supplied through resistor 86a, switch 84a, and power is interrupted by switch 70a or thermostats 18a. When contact 82a is closed, 24 volt power is applied to the coil 32a of relay 24a to close the power contactors. A pair of light emitting diodes 90a, together with a resistor 92a, are provided in parallel with the coil 32a to provide an indicator light for trouble shooting purposes.

The circuit through the normally closed thermostat 18a is also provided to a diode bridge 94a which directs the current through the triac controller 60a, 62a and 64a. The series circuit is completed through a light emitting diode 96a provided for trouble shooting and resistor 98a to the bridge 94a. The circuit is then completed through a switching transistor 100a to ground. The switching transistor 100a is turned "on" by the programmed digital processor 20 in order to activate the outputs from the controller 60a, 62a, and 64a as will presently be described.

In the event the high limit thermostat 18a opens as a result of a high temperature limit being exceeded, current to the coil 76a through resistor 86a, switch contact 84a, and resistor 74a is interrupted causing contact 82a to move to the open position illustrated. In that position, current from the 24 volt power source is supplied through relay 32a, switch contactor 82a, diode 102a and resistors 104a and 106a to ground. A voltage signal is thus provided to the digital processor 20 through line 108a which is used to provide high temperature alarm for the operator.

In the operation of a system of FIG. 2, the switch 70a is manually closed to instantaneously connect power through capacitor 72a and resistor 74a to energize coil 76a. Relay contactors 82a and 84a are then closed to provide holding current to the coil 76a through resistors 86a, contact 84a, and resistor 74a to the coil 26a and ground. This provides 24 volt power by way of closed contact 82a to coil 32a to close the mechanical contactors 26a, 28a and 30a to provide line power to the nodes 34a, 36a and 38a.

When the switch 70a is closed, power is also provided through high limit thermostat 18a, and diode bridge 94a to the optical triac controllers 60a, 62a and 64a, diodes 96a, resistor 98a, and the other half of the bridge 94a to the collector of transistor 100a. Thus, the system is ready for operational control by the digital processor 20. The digital processor provides a voltage to the transistor 100a which turns on the triac controllers 60a, 62a and 64a whenever power is required. The triac controllers then turn on the respective triacs 42a, 48a and 54a at the next zero voltage crossing of the AC power signal imposed across the respective triac. The capacitors 58a and veristors 60a protect the triacs from line surges during this switching. Thus, the triacs can be switched on and off a each zero crossing, if desired, by the digital processor.

In the event the temperature of the cooking oil in the vat exceeds the high limit temperature setting as sensed by the high limit thermostat 18a, the thermostat opens. This immediately disables any current from the optical controllers 60a, 62a and 64a so that the triacs 42a, 48a and 54a cannot be turned on, thus immediately and directly assuring that no further current is supplied through these devices. More importantly, the opening of contact 82a also causes the relay 24a to fall out, thus opening the mechanical contactors 26a, 28a and 30a, thus disconnecting all power from the heating elements. This provides a mechanical fail safe system in the event the solid state devices in series with the heating elements should short out and be the cause of the overheat condition. At the same time, the switch 82a provides current from the 24 volt power supply through the coil 32a, diode 102a and the voltage divider formed by resistors 104a and 106a, thus providing a voltage signal on line 108a to the digital processor which is used to provide the appropriate alarm to the operator that a high limit condition has occurred.

The digital controller 20 controls the transistors 100a and 100b to control the temperature of the cooking oil in the frypots 12a and 12b, respectively, utilizing the program subroutines illustrated in FIGS. 3, 4, 5 and 6. In general, the power to the heating elements is switched "on" and "off" by the triacs based for different portions of the total 500 millisecond duty cycle period to provide modulation. This is achieved by using a decrementing counter which can be set from zero to 250 counts, incrementing at 2 millisecond intervals. Thus, a full duty cycle represents 30 cycles of a 60 Hz power supply. Accordingly, the triacs can be turned "on" at half waveform intervals for from zero to thirty sinewave cycles. Because of this very short duty cycle, the power to the heating elements is effectively variable over the entire range from full "off" to full "on", particularly when viewed in the context of the thermal inertia of the heating elements.

In normal operation, the digital processor includes date input means for inputting a large variety of data including the idealized temperature at which a particular food product is to be cooked, which is referred to as the "set point" temperature. An idealized cooking time is also provided which is the time required if the set point temperature will be maintained at all times during the cooking period. In some cases, the set point temperature may vary over the cooking period. In practice, it is impossible to control the temperature of the cooking oil precisely at the set point temperature, even if substantial excess heating capacity is provided by the rated size of the heating elements. Thus, the temperature may vary significantly depending on the cooking load, and accordingly, time adjustments are typically provided by the digital processor based on the actual temperature of the oil during the cooking cycle. In order to achieve a rapid recovery to the desired set point temperature after a heavy cooking load has been introduced and cooled the oil, it is desirable to provide high heat power to provide rapid recovery. However, the more rapid the recovery capability, the more likely the temperature will overshoot the desired set point temperature after the heat is turned off. Any significant overshoot is unacceptable because it significantly degrades the quality of the cooked product. As a result, the digital processors have heretofore estimated when the power should be turned "off" to achieve the desired set point within the minimum recovery time yet with the minimum overshoot.

The present invention provides for the first time a practical approach to providing a proportional control of the heat applied to the heaters related to the difference in the actual temperature and the desired set point temperature. Thus, in the present invention, a proportional control band equal to ten degrees below the set point temperature is provided and the power applied to the heating elements is proportioned by the duty cycle modulation to provide a proportional relationship of maximum power to the difference in the actual temperature and the set point temperature. By substantially oversizing the heating elements and available power, the recovery time to set point temperature can be very rapid, with minimum overshoot because of the precise control.

Additionally, during the melting of solid shortening placed in the container for the first time, and in the instance of the initial warm-up at the start of business each day, it is desirable to provide a special procedure to ensure that the elements are not turned full on below the start of the proportional band, which is selected as ten degrees below the set point. During this period, the power is arbitrarily maintained at some fractional level, in the present case about twenty percent until either the set point temperature is achieved, or optionally, the corresponding twenty percent point within the porportional control band.

Figure 3:
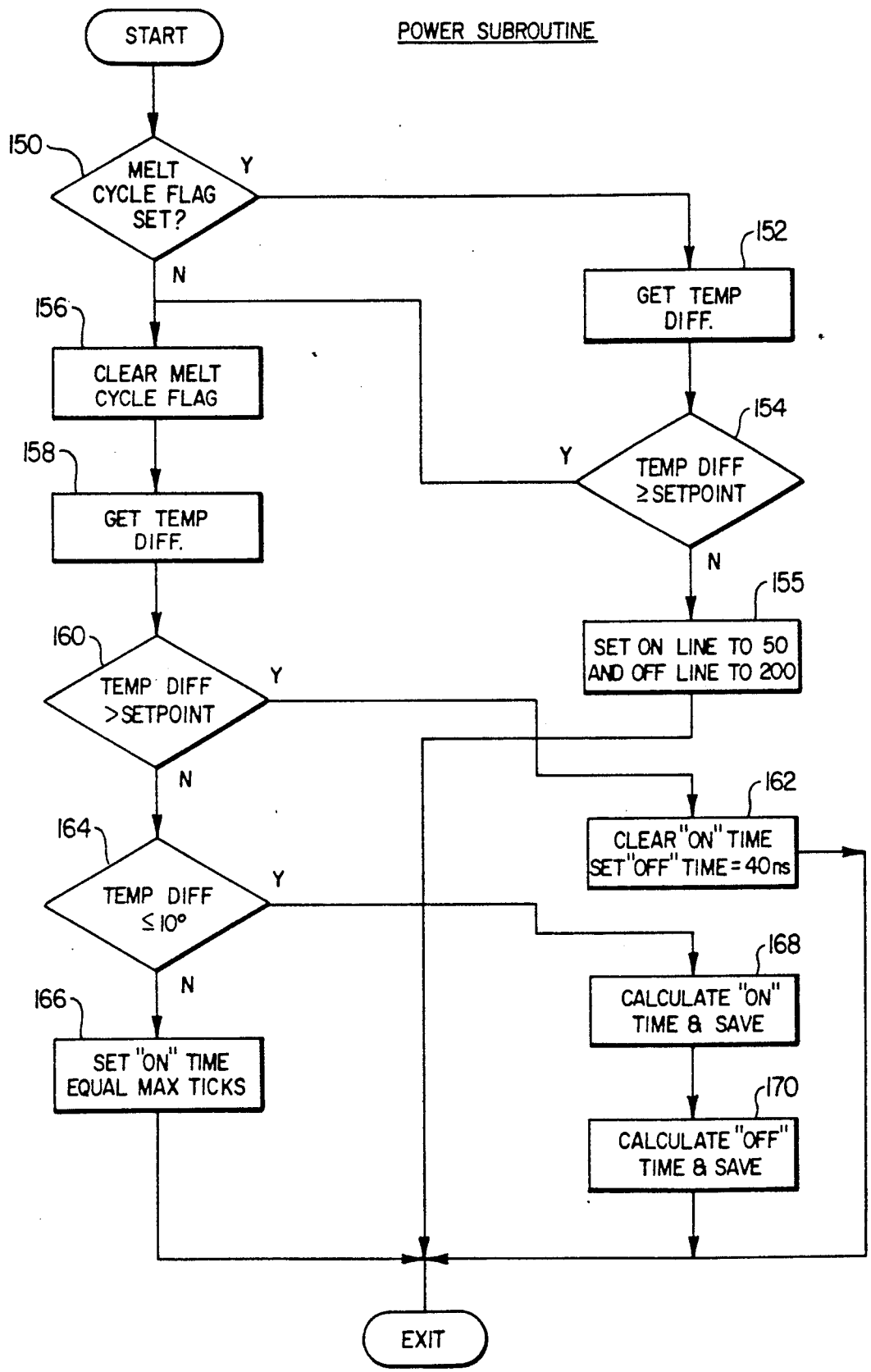
FIGS. 3, 4, 5 and 6 are flow diagrams illustrating how the digital processor of device of FIGS. 1 and 2 is programmed to achieve certain control functions.
Figure 4:
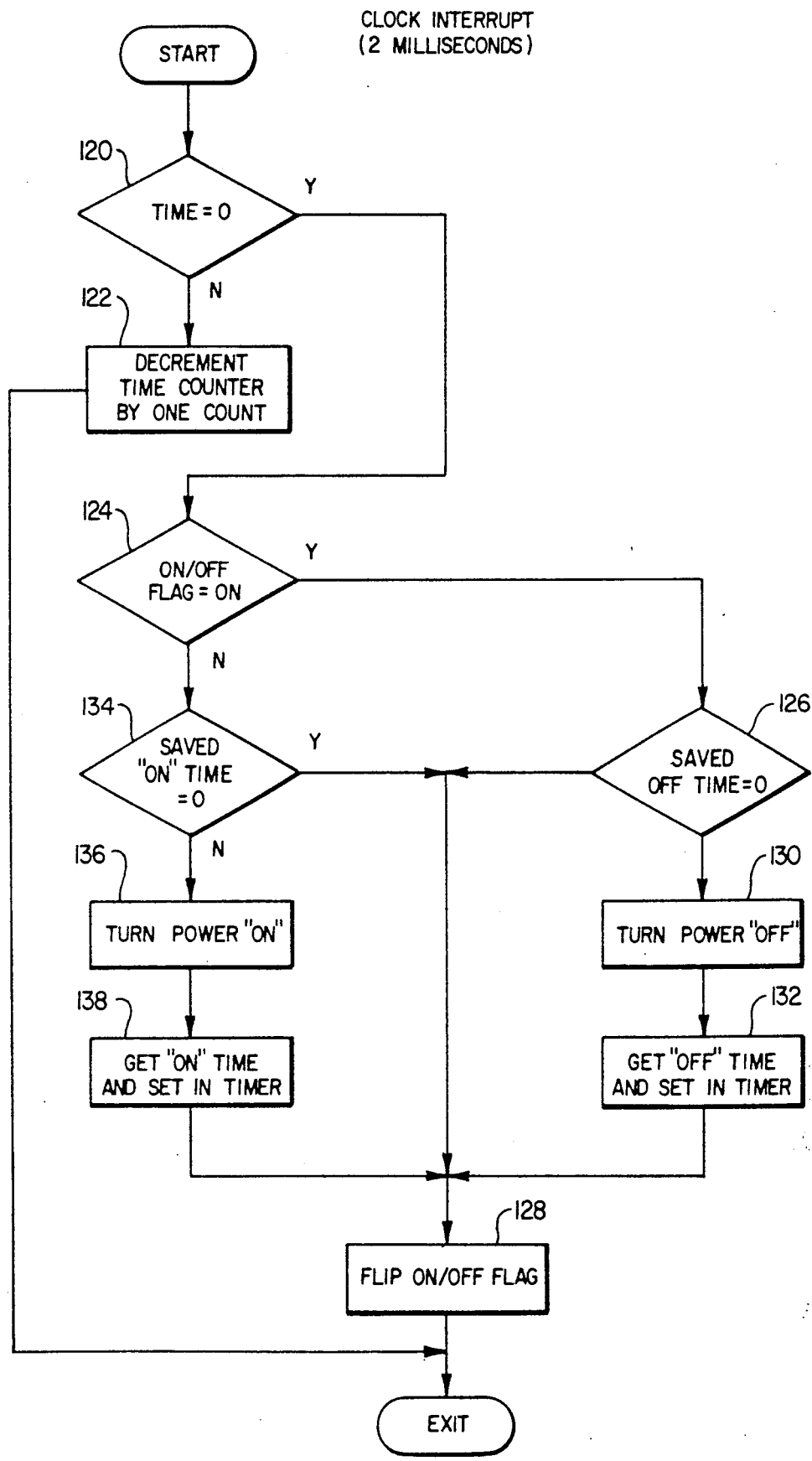

Referring now to FIG. 3, the power subroutine is periodically entered as time permits during routine operation of the digital processor. The clock interrupt subroutine illustrated in FIG. 4 is entered every two milliseconds and is used to control the duty cycle time and to generate the command to turn the respective transistors 100a and 100b on and thereby provide heat to the respective frypots 12a and 12b. The subroutines of FIG. 5 for calculating the "on" time and of FIG. 6 for calculating the "off" time are actually part of the power subroutine of FIG. 3. As previously mentioned, during start-up, a melt cycle mode is automatically entered into by the digital controller, or on command from the operator.

At two millisecond intervals, the clock interrupt subroutine of FIG. 4 is started. The clock interrupt subroutine first checks to see if the time in the decrement counter is equal to zero as represented by decision block 120. If the time is not zero, the tgime counter is decremented by one count as represented by the decision block 122 and the interrupt subroutine is exited. On the other hand, if the time is equal to zero, the on/off flag is checked as represented by decision block 124. The on/off flag indicates whether the counter is timing the "on" power portion of the duty cycle or the "off" power portion. If the on/off flag indicates that the power on duty cycle was being timed and the timer is now zero, the program then proceeds to decision block 126 where the saved off time is checked to see if it is zero. If zero, then there is no desire to proceed to a power off cycle, but the power on/off flag is flipped as represented at block 128 in preparation for the next clock interrupt subroutine. If the saved power off time is not equal zero, the power is turned off as represented by block 130, and the calculated power off time is set in the timer as represented in block 132 before proceeding to flip the power on/off flag by block 128 to indicate that a power off cycle is being timed.

On the other hand, if the decision block 124 indicates that the flag is in the power off condition, the saved power on time is checked as represented by decision block 134. If the saved power on time is equal to zero, the power on/off flag is flipped as represented by block 128 in preparation for the next interrupt subroutine. On the other hand, if there is time in the power on time location, the power is turned on as represented by block 136, and the calculated power on time is set in the timer as represented by block 138, before flipping the power on/off flag as represented by block 128 to set up a power on duty cycle and exiting the program.

The power subroutine illustrated in FIG. 3 basically determines whether to operate the system in the melt cycle mode or in the proportional control mode. Upon entering the subroutine, the melt cycle flag is first checked as represented by decision block 150. If the melt cycle flag is set, the subroutine proceeds to get the temperature differential between the set point temperature and the actual temperature as represented by block 152. This temperature differential is then checked to see if it indicates that the actual temperature is greater than or equal to the set point temperature. If the temperature differential indicates that the actual temperature is less than the set point temperature, it is desired to stay in the melt cycle mode, the melt cycle on time of 50 ticks and off time of 200 ticks is saved for use by the intercept subroutine of FIG. 4 as represented by block 155, and the power subroutine is exited.

On the other hand, if the temperature now exceeds the set point temperature, the program proceeds to clear the melt cycle flag as indicated by block 156, and again fetches the temperature differential as represented by block 158, where it is now checked to determine if the temperature differential indicates that the cooking oil temperature is greater than the set point temperature as represented by decision block 160. If greater, the power on time is cleared, or set to zero, and the power off time is set to 40 milliseconds as represented by block 162 so that the power will stay off for 20 counts before again entering the subroutine, to allow the temperature to cool down.

If the temperature differential is not greater than the set point, the temperature is then checked to see if it is less than or equal to 10 degrees, i.e., to see if the temperature is in the ten degree proportional control band. If the temperature differential is greater than 10 degrees, the on time is set to the maximum ticks as represented by block 164 before exiting the program so that the power will stay on for the entire next duty cycle of 0.5 seconds. If the temperature differential is less than or equal to 10 degrees, the power subroutine then proceeds to calculate and save the power on time as represented by block 168, then calculates and saves the power off time as represented by block 170 before exiting the routine.

Figure 5:
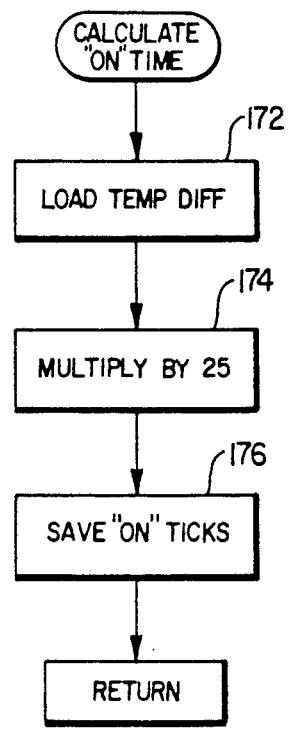
Figure 6:
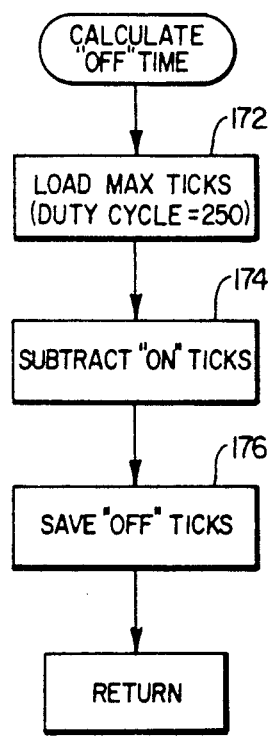

The power on time is calculated as represented by the subroutine in FIG. 5 where the temperature differential is loaded as represented by block 172, the differential is multiplied by 25 as represented by block 174, and the resulting number of power on ticks is saved as represented by block 176. These ticks will subsequently be inserted into the timer by the interrupt subroutine of FIG. 4. Similarly, the power off time is calculated by the subroutine illustrated in FIG. 6 where the maximum number of ticks is loaded, as represented by block 172. In the present case, the duty cycle is 250 ticks, which is 500 milliseconds, and therefore 250 is loaded at block 172. Next, the on ticks, calculated and saved in block 176, are subtracted from the maximum ticks as represented by block 174 to produce the off ticks which is then saved as represented in block 176.

Thus, it will be seen that an improved cooking system has been provided in which very high power electrical heating elements, oversized if economically practical, can be used in a deep fat fryer and operated in a manner to minimize the maximum surface temperatures of the heating element surfaces during all phases of operation, and thus minimize degradation of the cooking oil. Yet, the precise proportional control of high power devices provide a means by which recovery time after a heavy cooking load such as frozen french fries have been suddenly dumped in the oil can be maximized, while minimizing overshoot at the set point temperature. A method of operation has also been disclosed by which the maximum power consumption of a battery of two or more of the units can be minimized by maintaining a low power heat up during melt cycle or initla warm-up all the way to the set point temperature. This is all achieved while also providing longer life because of the solid state switching devices, and while simultaneously preserving the fail safe features of the mechanical thermostat and mechanical contactors in high limit conditions.

Although preferred embodiments of the invention have been described in detail, it is to be understood that various changes, substitutions and alterations can be made therein without departing from the spirit and scope of the claims as defined by the appended claims.

What is claimed is:
1. The high power, deep fat frying system for cooking comestibles in a liquified cooking oil comprising:
 a container for the cooking oil;
 an electric resistive heating element positioned to be immersed in the cooking oil to heat the cooking oil;
 temperature sensing means for sensing the actual temperature of the cooking oil and providing an electrical signal representative thereof;
 mechanical high limit thermostat means for sensing a high limit temperature and opening mechanical contacts in an electrical circuit;
 on/off switch means for turning the cooking system on;
 normally open, coil driven mechanical contactors for controlling power to the heating elements;
 high limit circuit means including the contacts of the high limit thermostat means and the coil of the mechanical contactors responsive to the on/off switch for activating the coil to close the contactors when the system is turned on, and for opening the mechanical contactors in the event the high limit thermostat opens;
 control circuit means including solid state triac power switching devices connected in series with the mechanical contactors for controlling power to the heating elements, the control circuit including circuit means for switching the triac power switching devices on at the zero cross over points in response to an electrical signal, the control circuit means being disabled by an opening of the contacts of the high limit thermostat to prevent turning the triac power switching device on;
 programmed digital processing means connected to operate the control circuit means for operating the triac power switching devices in an on/off duty cycle mode during a duty cycle which is much less than the thermal time constant of the heating elements being controlled, the duty cycle being operated at a fractional constant power mode during a start-up period, and in a proportionally variable mode over a preselected proportional control band below the set point temperature during normal cooking operations to maintain a preselected set point temperature with minimum temperature overshoot.

2. The system of claim 1 wherein:
 the system is operated by a three-phase system and the system includes three power input terminals;
 three heating elements connected in a delta configuration across the three input terminals to provide three power nodes; and
 a mechanical contactor and a triac power switching device are connected in series between the respective power nodes of the delta connected heating elements.

3. The system of claim 2 wherein each triac power switching device is controlled by an optical isolation device including a zero crossover trigger circuit for effective zero voltage switching of the respective triac power switching device, and the optical switching devices are connected in series with the high limit thermostat so as to be disabled from operation when the contacts of the high limit thermostat are opened.

* * * * *